United States Patent [19]

Bridges

[11] 4,343,477

[45] Aug. 10, 1982

[54] SEALING DEVICE WITH THERMAL EXPANSION PRESSURE ACCUMULATOR

[75] Inventor: Charles D. Bridges, Houston, Tex.

[73] Assignee: Combustion Engineering, Inc., Windsor, Conn.

[21] Appl. No.: 231,305

[22] Filed: Feb. 4, 1981

[51] Int. Cl.³ .......................... F16J 15/40; F16J 15/46
[52] U.S. Cl. ........................................ 277/73; 277/26; 277/27; 277/103; 277/135
[58] Field of Search .................. 277/3, 12, 26, 27, 70, 277/71, 103, 72 R, 72 FM, 73, 135, 34, 34.3, 34.6

[56] References Cited

U.S. PATENT DOCUMENTS

| | | | |
|---|---|---|---|
| 572,053 | 11/1896 | Garlock | 277/73 |
| 1,914,741 | 6/1933 | Gysling | 277/26 |
| 2,174,366 | 9/1939 | Guiberson et al. | 277/73 X |
| 3,129,948 | 4/1964 | Kendall | 277/103 X |
| 3,277,797 | 10/1966 | Tyree et al. | 277/26 X |
| 3,403,915 | 10/1968 | Roberts | 277/3 |

FOREIGN PATENT DOCUMENTS 1081867 9/1967 United Kingdom .................. 277/73

Primary Examiner—Robert S. Ward, Jr.
Attorney, Agent, or Firm—Cushman, Darby & Cushman

[57] ABSTRACT

For sealing between two metal parts, e.g. a bonnet and a pipe string when one is coaxially received in a recess of the other, the sealing annulus includes a body of elastomeric material in communication with a reservoir of such material. This reservoir is provided with a structure for pressurizing the elastomeric material for receiving excess of such material from the sealing annulus and for supplying such material to the sealing annulus to prevent a deficiency.

6 Claims, 1 Drawing Figure

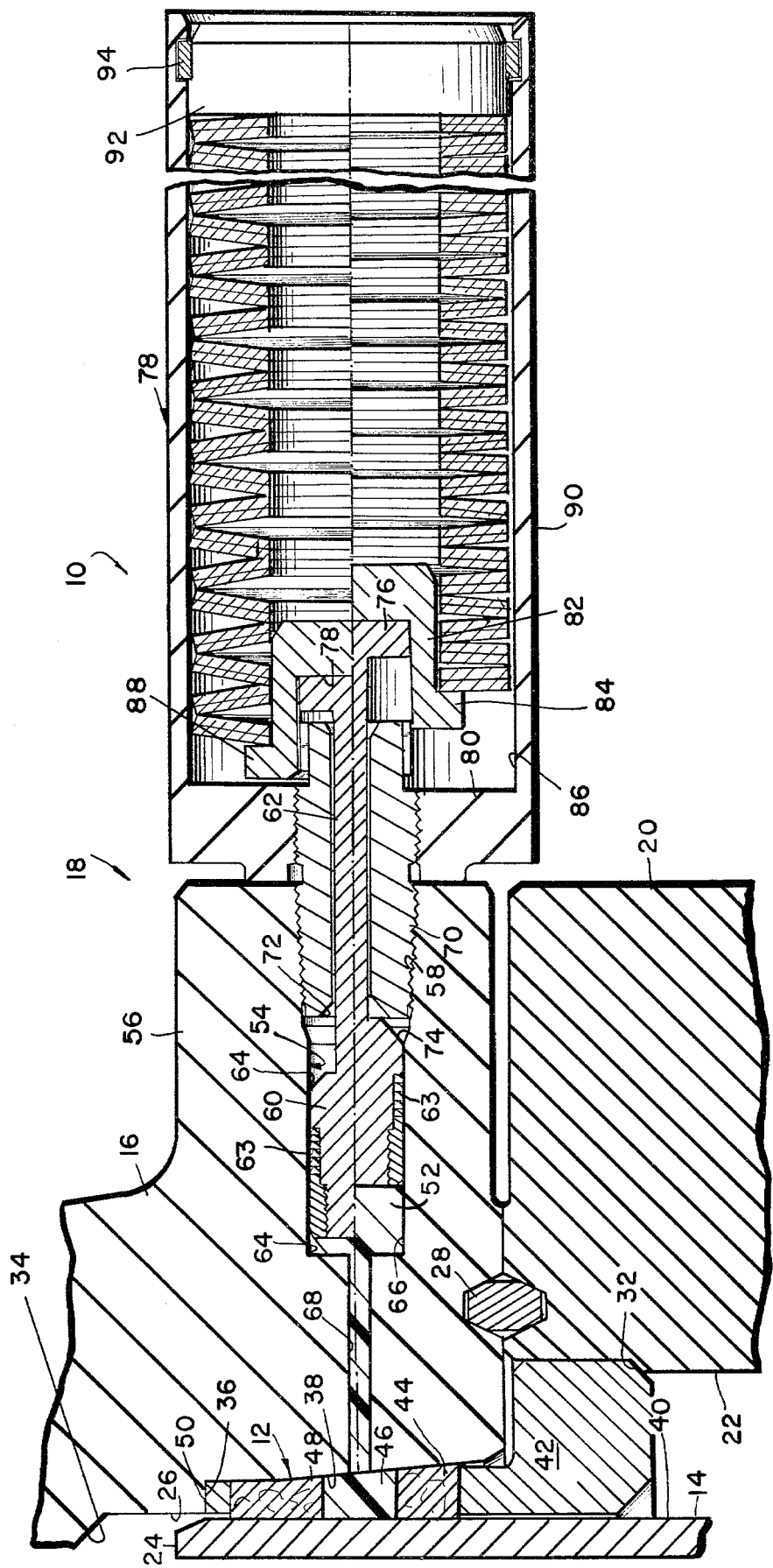

SEALING DEVICE WITH THERMAL EXPANSION PRESSURE ACCUMULATOR

BACKGROUND OF THE INVENTION

Elastomeric thermal expansion rates are some 8 to 10 times that of steels in general and if trapped or contained in steel housings can generate extreme pressures with a nominal temperature increase.

In an environment where temperature differentials would cause the elastomeric sealing elements, due to thermal contraction or expansion, to lose their preload or become overloaded to the point of extruding and/or collapsing the tubular product being sealed, there is a need to accommodate excess sealant and to adequately pressurize the elastic material into sealing relation with the parts to be sealed.

SUMMARY OF THE INVENTION

For sealing between two metal parts, e.g. a bonnet and a pipe string when one is coaxially received in a recess of the other, the sealing annulus, includes a body of elastomeric material in communication with a reservoir of such material. This reservoir is provided with a structure for pressurizing the elastomeric material for receiving excess of such material from the sealing annulus and for supplying such material to the sealing annulus to present a deficiency.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the Drawing:

The sole FIGURE shows in fragmentary longitudinal section an equipment assembly provided with a thermal expansion pressure accumulator in accordance with principles of the present invention. The piston is half in its extended position and half in its retracted position. One side of the piston shows the position at a lower temperature level while the other side shows a position at an elevated temperature due to thermal expansion.

DETAILED DESCRIPTION

Although the apparatus 10 of the invention could be used with a seal between a vessel mouth and a closure, between a rod or shaft and a tubular housing, or in general anywhere that a pressurized seal with an elastomeric component is sealingly received between two parts, it is shown in the drawing Figure in the particular context for which it was developed: e.g. used in connection with an annular seal means 12 between the outside of a string of pipe 14 and the inside of a bonnet 16 in a petroleum wellhead equipment assembly 18.

As shown in the FIGURE, the assembly 18 typically comprises a casing head or tubing head 20 in the longitudinal bore 22 of which a string of pipe 14 e.g. a string of casing or tubing is hung via a hanger (not shown, below the FIGURE). The string of pipe extends somewhat above where it is hung, so that its upper end 24 may be sealed with respect to the internal bore or inverted bowl-shaped cavity 26 of a bonnet 16. The bonnet 16 is shown conventionally sealed to head 20 via a sealing ring 28. The adjacent ends of the head 20 and bonnet 16 are bolted or otherwise conventionally externally clamped together (by means not illustrated).

The bore 22 of the head 20 near its upper end is shown provided with an internal, circumferentially extending upwardly facing shoulder 32.

The bore or internal cavity 26 of the bonnet 16 is shown provided near its lower end with an internal, circumferentially extending bell socket 34 delimited by a downwardly facing annular shoulder 36 and a sidewall 38.

In order to seal between the outer peripheral surface 40 of the pipe string upper end region and the inner peripheral surface 38 of the surrounding bonnet 16, a generally annular or tubular sealing assembly 12 is provided.

The seal assembly 12 is shown including an annular, relatively rigid, e.g. steel, foot plate 42 which rests on the shoulder 32, a first annulus of seal elements, e.g. a stack 44 of conventional chevron packing elements incorporating elastomeric material with internal textile or metallic fabric reinforcement means, an annular body 46 of viscous plastic fluid sealant which also may incorporate elastomeric material, a second annulus 48 of seal elements, which may be of the same constituency as the stack 44, and an annular, relatively rigid, e.g. steel, headplate 50 which seats against the shoulder 36. Usually, the free height of the assembly 12 is slightly longer than the distance between the shoulders 32 and 36, so that as the apparatus is assembled, the packing and sealing elements 44, 46, 48 will be axially compressed and radially expanded, and pressurized by confinement to effect the desired seal.

All described so far is utterly conventional.

The problem that arises in the prior art is due to the fact that the elastomeric material of the packing and sealing elements 44, 46, 48 usually has a much higher coefficient of thermal expansion than the e.g. steel or other metal of which the sealed parts 16 and 20 are made. Thus, if the equipment is subject to large fluctuations in temperature, e.g. due to heating-up while producing, there is a substantial, unwanted prospect that the sealing material 46 and/or the packing elements 44, 48 will extrude past the retainers 42, 50 or destructively deform or crack either of the sealed parts 16, 20. There is also the propsect that if the equipment is subject to cooling in use, that the preloading pressure provided by confinement of the sealing material 46 and packing elements 44, 48 will diminish too much to adequately continue to provide the desired sealing function.

To solve these problems, the apparatus modification 10 of the present invention is provided.

According to the present invention, the body 46 of the viscous plastic fluid sealant is placed in communication with a reservoir 52 thereof, which reservoir is provided to expand and contract due to variable magnitude external loading.

As shown, this is accomplished by boring a radially outwardly opening socket 54 in the lower end flange 56 of the bonnet 16. This socket or cavity 54 is shown provided near its mouth with a band of internal threading 58.

Within the cavity 54 there is shown slidingly received a piston 60 having a piston rod 62 which extends axially outwards from the piston 60 (radially out of the bonnet flange). The piston 60 is provided with piston ring means 63 in sliding, sealing contact with the cylindrical cavity wall 64, creating a reservoir 66 that is in communication via an internal passage 68 in the bonnet 16 with the annulus 46 of the plastic fluid sealant. The reservoir 66 and passage 68 are filled with the same sealant.

A tubular, exteriorly threaded nipple 70 is threaded into the cavity 54 behind the piston 60. The piston rod 62 passes outwards through a longitudinal bore 64 of the nipple 70. Outwardly of the piston the bore 64 has a flaring frusto-conical seat 72; a complementarily tapered seat 74 is formed on the outer end of the piston. Accordingly, should the piston be forced all the way out its seat 74 will engage and form a metal-to-metal seal with the seat 72 on the nipple 70. Axially beyond the nipple 70 the piston rod 62 is provided with an upset (enlargement) 76 that is of a larger diameter than the bore 64 to provide a stop at 78 for limiting inward movement of the piston. The fact that structures larger than the bore 64 are provided at opposite ends of the rod 62 means that one or the other of these structures must be fastened to the rod after the rod is inserted through the nipple 70, or else the nipple 70 must be made in a longitudinally split condition and assembled about the piston rod 62.

The nipple 70 is long enough that when fully installed it projects radially outwardly of the end flange of the bonnet. A generally tubular spring cage 78 is shown, having one internally threaded end 80 by which it is threaded onto the exposed part of the nipple 70 until it is supported tight against the lower end flange of the bonnet 16.

A cup portion 82 of a bowler hat-shaped spring foot 84 is received on the piston rod upset 76 within the bore 86 of the spring cage 78. The spring foot 84 cup 82 has a circumferential rim 88 that turns radially outward. A stack 90 of Bellville washer-type spring elements, i.e. a compression coil spring means, seats on the flange 88. An outer end wall 92 for the cage 78 is installed to maintain the spring 90 in a preloaded, partially compressed condition. The outer end wall 92 is shown held in place by a snap ring 94.

The spring cage may be preassembled with the spring foot, the spring, the end wall and the snap ring, and this assembly screwed onto the protruding part of the nipple 70, or the spring cage can be assembled empty to the nipple 70, and filled through its outer end, with the outer end wall and snap ring being received last.

For use in apparatus and other conditions of the type described hereinabove, the equipment shown will control the resultant thermal differential pressure due to expansion and contraction of the sealant through the reservoir, piston and mechanical spring stack.

In the arrangement shown, temperature increases will create a volumetric growth in seal elements 44 and 48 and fluid plastic sealant 44 creating increased forces abnormal for sealing the tubular part 14 to the housing 16. The increase in volume is felt in the reservoir area 66 and creates a force against the piston 60. This force is absorbed through the push rod 62 and mechanical spring stack 90 at a controlled rate. With any decrease in temperature, the preloaded spring stack reacts against the piston keeping the sealing force preload at or slightly above the initial sealing pressure. In the assembly shown, the spring stack is attached to the housing by a cage assembly and nipple.

The spring stack shown can be, as an alternate, replaced or supplemented by a body of compressed air or a compressable liquid (Ex. Dow Corning 200).

A substantially similar apparatus can be used in the reverse manner with temperatures that decrease from the initial installation point, by setting the initial sealing force to the high end of the allowable range and allowing the spring stack force to absorb the loss in volume due to thermal contraction.

It should now be apparent that the thermal expansion pressure accumulator as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For adequately but not excessively pressurizing an annulus of fluid viscous plastic sealant material that is received, confined and held compressed in an annular pocket coaxially between the outer periphery of a surrounded, inner metal part and the inner periphery of a surrounding, outer metal part,
    a thermal expansion pressure accumulator comprising:
    housing means providing a cylinder;
    a piston sealingly slidingly received in the cylinder to provide a sealant reservoir chamber within the cylinder between one end of the piston and one end of the cylinder;
    means providing a fluid passage for communicating the sealant reservoir chamber with the annulus of fluid viscous plastic sealant material;
    said reservoir chamber and fluid passage being adapted to be filled with fluid viscous plastic sealant material in communication with said annulus;
    and compressible variable force means in operative contact with the opposite end of said piston so that, in use, as the pressure on said sealant tends to build up, said piston tends to retract in said cylinder and to correspondingly compress said compressible variable force means, and as the pressure on said sealant tends to fall, said compressible variable force means tends to extend said piston in said cylinder to apply more pressure to said sealant.

2. The thermal expansion pressure accumulator of claim 1, wherein:
    the housing means comprises a radially outwardly opening cavity formed in the outer metal part, and a nipple threaded into the cavity behind the piston.

3. The thermal expansion pressure accumulator of claim 2, wherein:
    the housing means further includes a spring cage fastened onto the nipple; and
    the compressible variable force means comprises a compression coil spring means received in said spring cage and arranged to effectively bear against the piston.

4. The thermal expansion pressure accumulator of claim 3, wherein:
    the piston includes a piston rod which slidingly projects through the nipple into the spring cage;
    an enlargement means provided on the piston rod within the spring cage;
    the compression coil spring engaging said enlargement to effectively bear against the piston.

5. The thermal expansion pressure accumulator of claim 1, wherein:
    the annulus of fluid viscous plastic sealant material is the central element in a tubular stack of elements in a sealing assembly, in which the said annulus is axially adjoined by stacks of packing annuluses which are, in turn, axially adjoined by annular metal retainers.

6. The thermal expansion pressure accumulator of claim 2, wherein:
the inner metal part is a string of pipe and the outer metal part is a bonnet.

* * * * *